(12) United States Patent
Ramseyer

(10) Patent No.: US 11,740,115 B2
(45) Date of Patent: Aug. 29, 2023

(54) MEASURING DEVICE

(71) Applicant: Endress+Hauser Flowtec AG, Reinach (CH)

(72) Inventor: Severin Ramseyer, Münchenstein (CH)

(73) Assignee: Endress+Hauser Flowtec AG, Reinach (CH)

(*) Notice: Subject to any disclaimer, the term of this patent is extended or adjusted under 35 U.S.C. 154(b) by 136 days.

(21) Appl. No.: 16/973,229

(22) PCT Filed: May 10, 2019

(86) PCT No.: PCT/EP2019/062092
§ 371 (c)(1),
(2) Date: Dec. 8, 2020

(87) PCT Pub. No.: WO2019/233706
PCT Pub. Date: Dec. 12, 2019

(65) Prior Publication Data
US 2021/0239502 A1 Aug. 5, 2021

(30) Foreign Application Priority Data
Jun. 8, 2018 (DE) ..................... 10 2018 113 726.5

(51) Int. Cl.
G01F 1/84 (2006.01)
G01F 15/02 (2006.01)
G01N 9/32 (2006.01)

(52) U.S. Cl.
CPC .......... G01F 1/8431 (2013.01); G01F 1/8422 (2013.01); G01F 1/8427 (2013.01);
(Continued)

(58) Field of Classification Search
CPC .... G01F 1/8409; G01F 1/8431; G01F 1/8422; G01F 1/8427; G01F 1/8477
See application file for complete search history.

(56) References Cited

U.S. PATENT DOCUMENTS

2016/0138952 A1* 5/2016 Wang ................... G01K 7/16
73/204.25
2018/0143050 A1* 5/2018 Amann ................. G01K 1/00

FOREIGN PATENT DOCUMENTS

DE 4427181 A1 2/1996
DE 29716885 U1 4/1998
(Continued)

*Primary Examiner* — Erika J. Villaluna
(74) *Attorney, Agent, or Firm* — Kelly J. Smith; Endress+Hauser (USA) Holding, Inc.

(57) ABSTRACT

A measuring device for measuring flow velocity includes a measuring tube, a measuring transducer for registering a measured variable and outputting a first measured value representing the measured variable, a temperature sensor, and an electronic measuring/operating circuit. The temperature sensor has a sensor element and electrically conductive leads. Each lead is connected with the sensor element and has a first section following on the connection location. The sensor element has a maximum periphery. The first section has a separation of less than 5% of a measuring tube radius from a measuring tube wall, wherein a length of each lead in the first section is at least 25% of the maximum periphery. The leads are guided in their first section at least in certain regions along the maximum periphery, and in their first section are in certain regions in thermal contact with the measuring tube.

8 Claims, 3 Drawing Sheets

(52) U.S. Cl.
CPC .......... *G01F 1/8477* (2013.01); *G01F 15/022* (2013.01); *G01N 9/32* (2013.01)

(56) References Cited

FOREIGN PATENT DOCUMENTS

| | | |
|---|---|---|
| DE | 19802296 A1 | 3/1999 |
| DE | 102011080415 A1 | 2/2013 |
| DE | 102014116658 A1 | 5/2016 |
| DE | 102014116658 B4 | 6/2016 |

* cited by examiner

MEASURING DEVICE

CROSS-REFERENCE TO RELATED APPLICATIONS

The present application is related to and claims the priority benefit of German Patent Application No. 10 2018 113 726.5, filed on Jun. 8, 2018 and International Patent Application No. PCT/EP2019/062092 filed on May 10, 2019, the entire contents of which are incorporated herein by reference.

TECHNICAL FIELD

The invention relates to a measuring device, especially a Coriolis measuring device, for measuring flow velocity or volume flow or density of a medium flowing through at least one measuring tube, wherein the measuring device has a temperature sensor.

BACKGROUND

Measuring arrangements with temperature sensors are known. Thus, DE102014116658B4 discloses a measuring arrangement with a temperature sensor, in the case of which electrical lines for operating the temperature sensor are separately secured using a supplemental securement element.

In the case of measuring arrangements with temperature sensor according to the state of the art, there is the problem that heat can drain away from the temperature sensor via the electrical lines and, thus, corrupt a temperature measurement.

SUMMARY

An object of the invention is, consequently, to provide a measuring device, in the case of which such a corruption of a temperature measurement is at least lessened.

The object is achieved by a measuring device as defined in independent claim 1.

A measuring device of the invention, especially a Coriolis measuring device, for measuring flow velocity or mass flow or density of a medium flowing through at least one measuring tube, comprises:

the at least one measuring tube for conveying the medium;

a measuring transducer, which is adapted to register at least one measured variable and, at any one time, to output at least a first measured value representing the measured variable;

at least one temperature sensor, which is adapted to register a temperature of the measuring tube, an electronic measuring/operating circuit, which is adapted to operate the measuring transducer as well as the temperature sensor as well as to provide flow and/or density measurement values, wherein the temperature sensor has a sensor element and at least two electrically conductive leads for electrical connection of the sensor element with the electronic measuring/operating circuit, wherein each lead is connected with the sensor element in the region of a connection location of the sensor element, wherein each lead has a first section following on the connection location, wherein the sensor element has a maximum periphery, wherein the first section has a separation of less than 5% of a measuring tube radius from a measuring tube wall, wherein a length of each lead in the first section is at least 25% of the maximum periphery, wherein the leads are guided in their first section at least in certain regions along the maximum periphery, or following the maximum periphery, wherein the leads in their first section are at least in certain regions in thermal contact with the measuring tube.

By guiding the leads at least in certain regions along the maximum periphery, or following the maximum periphery, in thermal contact with the measuring tube, the leads in their first section assume, as in the case of the sensor element, the temperature of the measuring tube, so that a heat drain via the leads from the sensor element is small, or negligible.

In an embodiment, the thermal contact between lead and measuring tube is produced by direct contact and/or by means of a heat conductive material, such as, for example, a heat conductive paste or adhesive, wherein the heat conductive material has a thermal conductivity in W/(m*S) of at least 0.5, and, especially, at least 1 and preferably at least 2.

By direct contacting of the leads with the measuring tube, heat transfer between lead and measuring tube can occur rapidly. Alternatively, heat transfer can be produced by means of a heat conductive paste, in which the leads are at least partially embedded. By supplemental use of heat conductive paste, heat transfer can be further improved.

In an embodiment, the sensor element is, for example, one of the following: resistance element, especially a thin film resistance element, Peltier element, semiconductor element.

In an embodiment, the temperature sensor includes a securement element, which is adapted to secure the sensor element and the first sections of the leads at least in certain regions to the measuring tube. The securement assures stable heat transfer conditions and, thus, a stable functioning of the temperature sensor.

In an embodiment, the securement element is a piece of sheet metal, which is adapted to cover, at least in certain regions, the resistance element as well as the first sections of the leads.

In an embodiment, the securement element includes a central region and two outer regions enclosing the central region, wherein the central region covers the resistance element as well as the first sections of the leads at least in certain regions, wherein the securement element is secured in the outer regions by welding to the measuring tube.

In an embodiment, the piece of sheet metal is composed of more than one ply.

In an embodiment, the piece of sheet metal or at least one ply of the piece of sheet metal has a specific heat capacity in kJ/(kg*S) of less than 0.9 and preferably less than 0.7 and, especially, less than 0.5 and/or wherein the piece of sheet metal or at least one ply of the piece of sheet metal has a thermal conductivity in W/(m*S) of at least 50, and, especially, at least 100 and preferably at least 150.

In order to assure a minimal influence of the securement on the measuring tube as well as on the temperature sensor, high thermal conductivity and low heat capacity are advantageous.

In the case of use of a multi-ply piece of sheet metal, for example, an inner ply of the piece of sheet metal can be adapted to accomplish the temperature matching, and another ply of the piece of sheet metal protecting the inner ply of the piece of sheet metal and having lower thermal conductivity can be adapted to suppress, or slow, corrosion of the inner ply of the piece of sheet metal.

In an embodiment, an outer, measuring tube far, first ply of the piece of sheet metal is made of an oxygen blocking and/or water impermeable material, wherein a second ply of the piece of sheet metal is made of a material with high thermal conductivity and low heat capacity, such as, for example, copper or silver or aluminum or an alloy having at least one of these materials.

In an embodiment, the leads have at least in the region of the securement element electrical insulation, wherein the electrical insulation comprises at least one of the following materials: a plastic, such as, for example, Teflon, polyimide, polyamide, polyethylene, or glass, or glass fabric, or ceramic.

Ideally, the plastic has a thermal conductivity of at least 0.2 W/(m*S).

In an embodiment, the at least one measuring tube is part of the measuring transducer, wherein the measuring transducer has at least one oscillation exciter, which is adapted to excite the at least one measuring tube to oscillate, wherein the measuring transducer has at least two oscillation sensors, which are adapted to register measuring tube oscillation.

BRIEF DESCRIPTION OF THE DRAWINGS

The invention will now be described based on examples of embodiments presented in the appended drawing, the figures of which show as follows.

DETAILED DESCRIPTION

Figure 1:
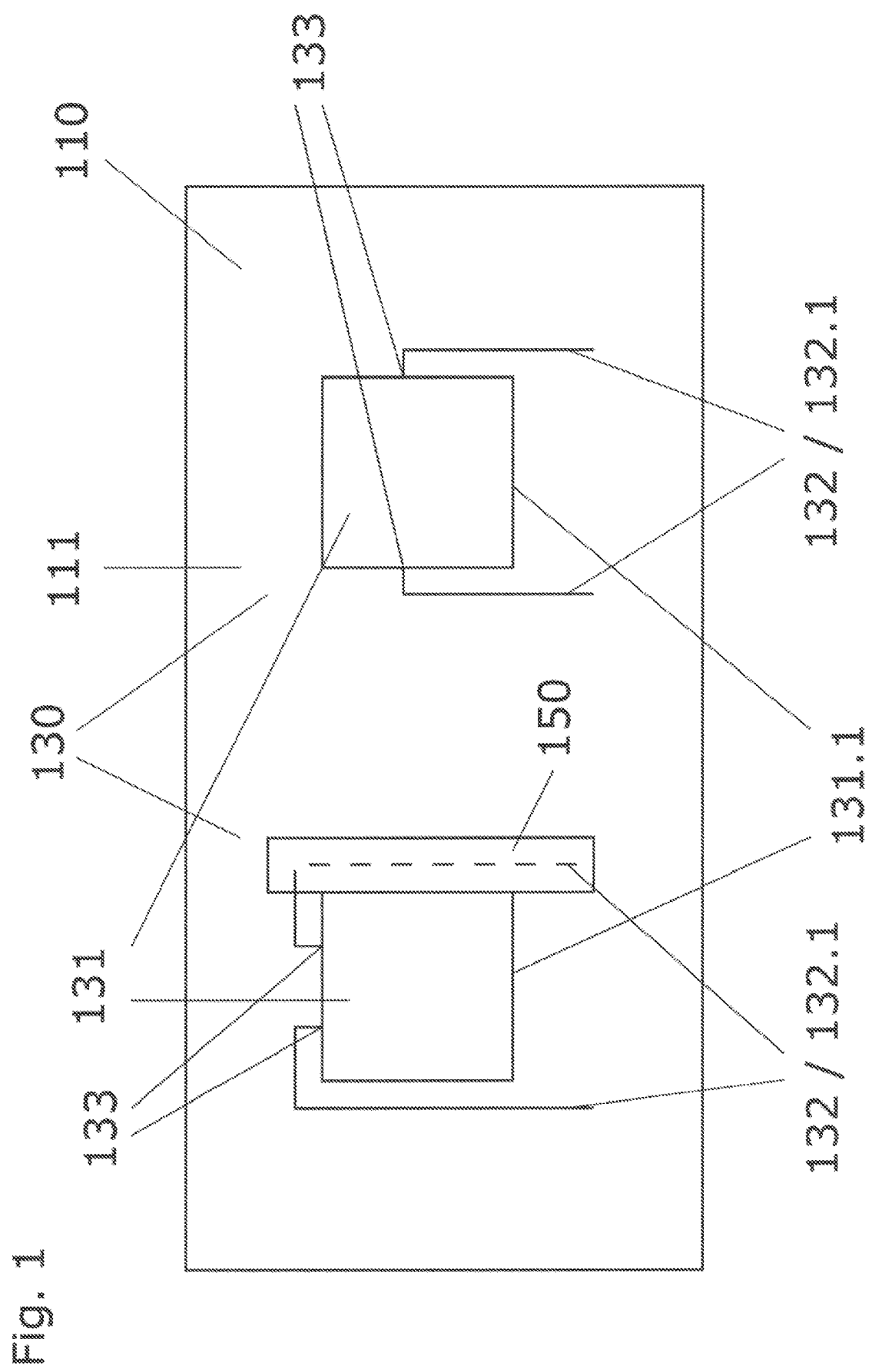
FIG. 1 shows by way of example, two temperature sensors of the present disclosure, which are applied on a measuring tube wall.

FIG. 1 shows, applied on a measuring tube wall 111 of a measuring tube 110 of a measuring device of flow measurement technology, two temperature sensors 130 of the invention, each of which has a sensor element 131 and two leads 132. The leads are, in each case, led in a first section 132.1 at least in certain regions along a maximum periphery 131.1 of the sensor element and are in thermal contact with the measuring tube. The thermal contact with the measuring tube can be produced by direct contact between lead and measuring tube and/or, such as shown by way of example on one lead, by means of a heat conductive paste 150. In the region of connection locations of the leads to the sensor element, or corners, or edges, of the sensor element, the guiding of the leads along the maximum periphery can be omitted, in order to avoid mechanical stressing of the leads, for example, because of abrupt bends. A measuring tube of a measuring device can have as many temperature sensors as desired. Thus, the arrangement shown in FIG. 1 is purely for purposes of illustration and is not to be construed as limiting.

Figure 2:
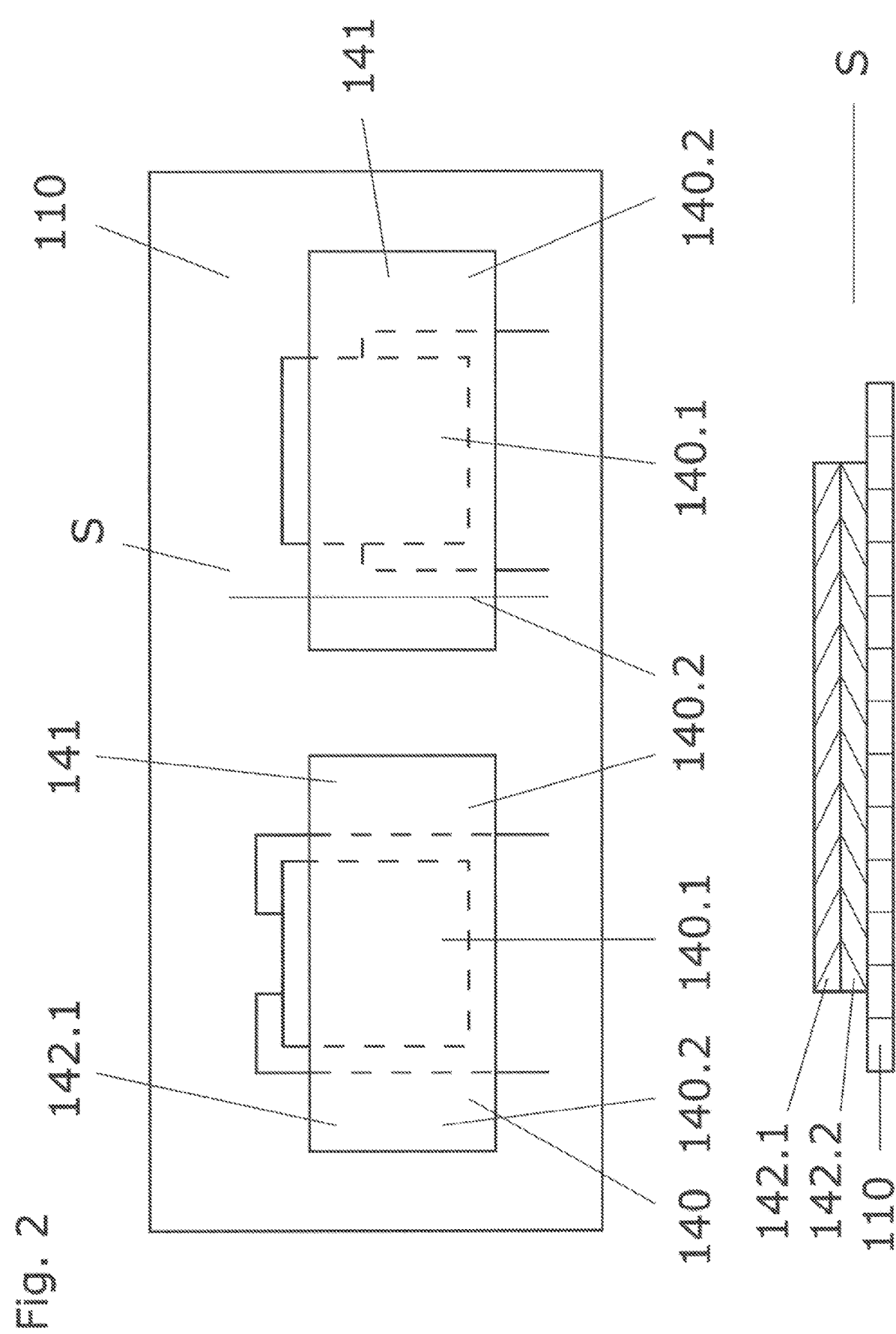
FIG. 2 shows by way of example, the two temperature sensors of FIG. 1, each of which is secured by means of a securement means.

FIG. 2 shows the two temperature sensors of FIG. 1 equipped now with securement elements 140. The securement elements can be, such as shown here, in each case, a piece of sheet metal 141 secured in outer regions 140.2 to the measuring tube, for example, by welding. Each securement element secures an underlying sensor element as well as its leads, at least in certain regions, by means of a central region 140.1. Each piece of sheet metal 140 can, such as shown in the cross-section S, have more than one ply. A first, measuring tube far, ply 142.1 of the piece of sheet metal is, in such case, preferably made of a stainless steel, especially a weldable stainless steel. A second ply of the piece of sheet metal is selected for a temperature matching and is made of a material with high thermal conductivity and/or low heat capacity, such as, for example, copper or silver or aluminum or an alloy having at least one of these materials. The securement assures stable heat transfer conditions between measuring tube and leads as well as sensor element and, thus, a stable functioning of the temperature sensor. The material of the piece of sheet metal or at least one ply of the piece of sheet metal has a specific heat capacity in kJ/(kg*S) of less than 0.9 and preferably less than 0.7 and, especially, less than 0.5 and/or the material of the piece of sheet metal or at least one ply of the piece of sheet metal has a thermal conductivity in W/(m*S) of at least 50, and, especially, at least 100 and preferably at least 150. A high thermal conductivity and a low heat capacity is advantageous in order to assure a minimal influence of the securement on the measuring tube as well as on the temperature sensor.

Figure 3:
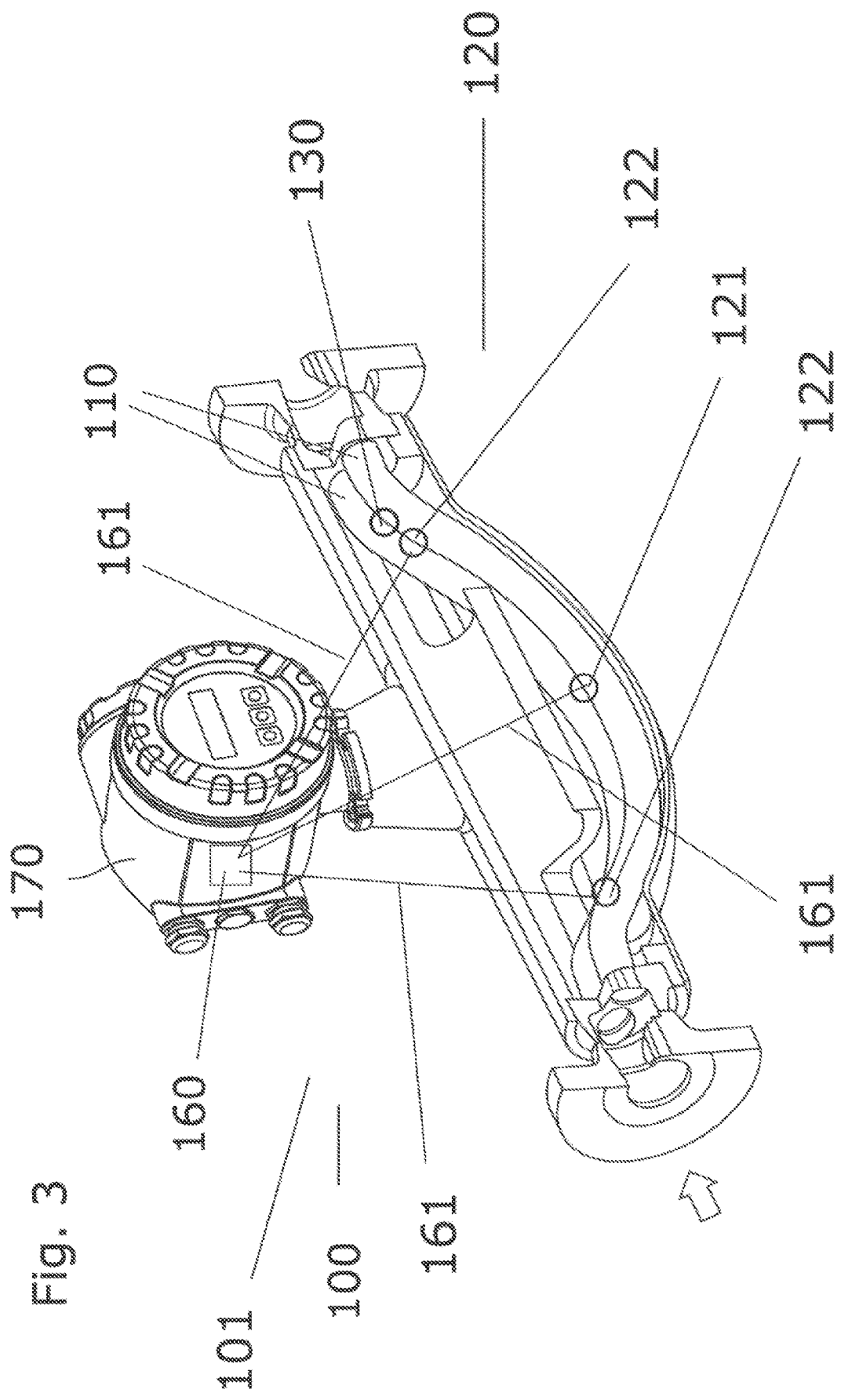
FIG. 3 shows a Coriolis measuring device of the present disclosure.

FIG. 3 shows a Coriolis measuring device 101 having a measurement transducer 120 and an electronics housing 170, in which an electronic measuring/operating circuit 160 is arranged. The measuring transducer includes two measuring tubes 110, which are adapted to convey a medium, as well as an oscillation exciter 121 and two oscillation sensors 122. The oscillation exciter is adapted to excite the measuring tubes to characteristic oscillations, which are registered by the oscillation sensors and can be taken into consideration for flow- and/or density measurement of the medium. The oscillation exciter and the oscillation sensors are connected by means of electrical connections with the electronic measuring/operating circuit. A temperature sensor 130 of the invention is adapted to register the temperature of a measuring tube.

Coriolis measuring devices are not limited to the presence of two measuring tubes. Thus, there are also measuring devices having one measuring tube and even those having four measuring tubes. Also the numbers of oscillation exciters and oscillation sensors as well as temperature sensors are not limited to the numbers shown here. FIG. 3 is purely for purposes of illustration and not to be construed as limiting.

Measuring devices of the invention are not limited to Coriolis measuring devices. Thus, for example, also ultrasonic, flow measuring devices or magnetically inductive flow measuring devices and even vortex flow measuring devices can be equipped with at least one temperature sensor of the invention. Those skilled in the art are able to apply the present teachings to use such a temperature sensor correspondingly in alternative flow measuring devices.

The invention claimed is:

1. A measuring device for measuring flow velocity or volume flow or density of a medium flowing through at least one measuring tube, comprising:
   the at least one measuring tube for conveying the medium;
   a measuring transducer adapted to register at least one measured variable and to output at least a first measured value representing the measured variable;
   a single temperature sensor adapted to register a temperature of the measuring tube; and an electronic measuring/operating circuit configured to operate the measuring transducer and the temperature sensor and provide flow or density measurement values;

wherein the temperature sensor has a sensor element and at least two electrically conductive leads for electrical connection of the sensor element with the electronic measuring/operating circuit;

wherein each lead is connected with the sensor element in the region of a connection location of the sensor element;

wherein each lead has a first section following on the connection location, wherein the sensor element has a maximum periphery;

wherein the first section has a separation of less than 5% of a measuring tube radius from a measuring tube wall, wherein a length of each lead in the first section is at least 25% of the maximum periphery;

wherein the leads are guided in their first section at least in certain regions along the maximum periphery;

wherein the leads wrap at least partially around the temperature sensor;

wherein the leads in their first section are at least in certain regions in thermal contact with the measuring tube;

wherein the thermal contact between lead and measuring tube is produced by direct contact or by means of a heat conductive material;

wherein the heat conductive material has a thermal conductivity in W/(m*S) of at least 0.5.

2. The measuring device of claim 1,
wherein the sensor element is one of the following: resistance element, Peltier element, semiconductor element.

3. The measuring device of claim 2,
wherein the temperature sensor includes a securement element adapted to secure the resistance element and the first sections of the leads in certain regions to the measuring tube.

4. The measuring device of claim 3,
wherein the securement element is a piece of sheet metal adapted to cover the resistance element as well as the first sections of the leads.

5. The measuring device of claim 4,
wherein the piece of sheet metal or at least one ply of the piece of sheet metal has a specific heat capacity in kJ/(kg*S) of less than 0.9, or
wherein the piece of sheet metal or at least one ply of the piece of sheet metal has a thermal conductivity in W/(m*S) of at least 50.

6. The measuring device of claim 5,
wherein a first ply of the piece of sheet metal is made of an oxygen blocking and/or water impermeable material, and
wherein a second ply of the piece of sheet metal is made, for example, of copper or silver.

7. The measuring device of claim 3,
wherein the securement element includes a central region and two outer regions enclosing the central region,
wherein the central region covers the sensor element as well as the first sections of the leads at least in certain regions, and
wherein the securement element is secured in the outer regions by welding to the measuring tube.

8. A measuring device for measuring flow velocity or volume flow or density of a medium flowing through at least one measuring tube, comprising:

the at least one measuring tube for conveying the medium;

a measuring transducer adapted to register at least one measured variable and to output at least a first measured value representing the measured variable;

a single temperature sensor adapted to register a temperature of the measuring tube; and an electronic measuring/operating circuit configured to operate the measuring transducer and the temperature sensor and provide flow or density measurement values;

wherein the temperature sensor has a sensor element and at least two electrically conductive leads for electrical connection of the sensor element with the electronic measuring/operating circuit;

wherein each lead is connected with the sensor element in the region of a connection location of the sensor element;

wherein each lead has a first section following on the connection location, wherein the sensor element has a maximum periphery;

wherein the first section has a separation of less than 5% of a measuring tube radius from a measuring tube wall, wherein a length of each lead in the first section is at least 25% of the maximum periphery;

wherein the leads are guided in their first section at least in certain regions along the maximum periphery;

wherein the leads wrap at least partially around the temperature sensor;

wherein the leads in their first section are at least in certain regions in thermal contact with the measuring tube;

wherein the thermal contact between lead and measuring tube is produced by direct contact or by means of a heat conductive material;

wherein the heat conductive material has a thermal conductivity in W/(m*S) of at least 0.5;

wherein the sensor element is one of the following: resistance element, Peltier element, semiconductor element;

wherein the temperature sensor includes a securement element adapted to secure the resistance element and the first sections of the leads in certain regions to the measuring tube;

wherein the securement element is a piece of sheet metal adapted to cover the resistance element as well as the first sections of the leads;

wherein the piece of sheet metal is composed of more than one ply.

* * * * *